US012662377B2

(12) United States Patent
Wilkins et al.

(10) Patent No.: US 12,662,377 B2
(45) Date of Patent: Jun. 23, 2026

(54) POROUS MATRIX SUBSTRATE WITH CHLORITE REACTANT FOR PRODUCING CHLORINE DIOXIDE

(71) Applicant: CHEMTREAT, INC., Glen Allen, VA (US)

(72) Inventors: James Campbell Wilkins, Midlothian, VA (US); Harold Russell Wilkins, Powhatan, VA (US); Mark J Puchovich, Henrico, VA (US); Megan Pettygrove, Glen Allen, VA (US); Benjamin Niemaseck, Chesterfield, VA (US)

(73) Assignee: CHEMTREAT, INC., Glen Allen, VA (US)

( * ) Notice: Subject to any disclaimer, the term of this patent is extended or adjusted under 35 U.S.C. 154(b) by 1317 days.

(21) Appl. No.: 17/475,859

(22) Filed: Sep. 15, 2021

(65) Prior Publication Data

US 2022/0081293 A1      Mar. 17, 2022

Related U.S. Application Data

(60) Provisional application No. 63/079,203, filed on Sep. 16, 2020.

(51) Int. Cl.
*C01B 11/02* (2006.01)
*C01B 13/10* (2006.01)
*C08L 23/06* (2006.01)
*C08L 27/12* (2006.01)

(52) U.S. Cl.
CPC ............ *C01B 11/024* (2013.01); *C08L 23/06* (2013.01); *C08L 27/12* (2013.01); *C01B 13/10* (2013.01)

(58) Field of Classification Search
CPC ....... C01B 11/024; C01B 13/10; C08L 23/06; C08L 27/12; C08K 3/16
See application file for complete search history.

(56) References Cited

U.S. PATENT DOCUMENTS

| | | | | |
|---|---|---|---|---|
| 5,476,579 A | * | 12/1995 | Choi | C01B 13/10 |
| | | | | 205/556 |
| 10,005,665 B2 | * | 6/2018 | Richardson | C02F 1/76 |
| 10,471,165 B2 | | 11/2019 | Richardson et al. | |
| 11,332,395 B2 | | 5/2022 | Burchtorf et al. | |
| 2005/0163854 A1 | * | 7/2005 | Hartman | A01N 25/34 |
| | | | | 424/661 |
| 2006/0039840 A1 | * | 2/2006 | Chia | C01B 11/024 |
| | | | | 422/305 |
| 2010/0025226 A1 | | 2/2010 | Callerame | |
| 2010/0025526 A1 | * | 2/2010 | Lawrence | B64U 40/10 |
| | | | | 244/17.23 |
| 2013/0209573 A1 | * | 8/2013 | Groves | A01N 59/00 |
| | | | | 422/129 |
| 2017/0157904 A1 | * | 6/2017 | Abbott | B32B 15/082 |

FOREIGN PATENT DOCUMENTS

WO      WO-2015098731 A1 *   7/2015   ............ B01J 19/123

* cited by examiner

*Primary Examiner* — Wayne A Langel
*Assistant Examiner* — Syed T Iqbal
(74) *Attorney, Agent, or Firm* — Oliff PLC

(57) ABSTRACT

A porous matrix substrate that has chlorite reactant distributed therein can be used to produce gaseous chlorine dioxide. Ozone-containing gas can pass through the porous matrix substrate and the ozone can react with the chlorite to produce chlorine dioxide.

12 Claims, 1 Drawing Sheet

POROUS MATRIX SUBSTRATE WITH CHLORITE REACTANT FOR PRODUCING CHLORINE DIOXIDE

CROSS-REFERENCE TO RELATED APPLICATIONS

This application claims the filing date benefit of U.S. Provisional Application No. 63/079,203, filed on Sep. 16, 2020.

BACKGROUND

Chlorine dioxide is widely used in various processes. It can be used as a disinfecting agent in potable water and wastewater treatment processes. It can also be used as a bleaching agent in the production of wood pulp, paper, oils, and flour. Chlorine dioxide is difficult to stably and safely transport, and thus is most often generated on-site (i.e., at the plant or facility in which it is used). Chlorine dioxide is typically produced using a liquid reactant solution. These methods typically involve reacting a chlorite with an acid or reacting chlorate with a reducing agent and an acid in solution. These liquid-based reactions can be inefficient and typically produce a product with significant levels of impurities, such as chloride, chlorate, and sulfate. Additionally, on-site storage of strong acids poses significant hazards and regulatory hurdles. Pure chlorine dioxide can be produced by employing gas stripping techniques. However, this involves additional costs and facilities and generally over-complicates the manufacturing processes.

Other methods for producing chlorine dioxide involve solid phase-gas phase reactions. These reactions typically produce relatively pure chlorine dioxide by reacting solid sodium chlorite with highly reactive chlorine gas. Chlorine gas is extremely hazardous and difficult to handle. As such, these methods for producing chlorine dioxide are expensive and burdensome to integrate into manufacturing facilities due to the required regulatory and safety procedures.

Another process for producing gaseous chlorine dioxide by reacting gaseous ozone with a solid chlorite media is described in U.S. patent application Ser. No. 14/878,603 (issued as U.S. Pat. No. 10,005,665). This process has many advantages over other conventional approaches, including producing high purity chlorine dioxide gas by a safe and convenient method. However, as explained in detail below, it has been discovered that using certain forms of solid reactant media consumes the chlorite inefficiently and unpredictably.

SUMMARY

It has been discovered in connection with this disclosure that the above-mentioned drawbacks of reacting ozone with solid chlorite media can be ameliorated by distributing the chlorite reactant in a porous matrix, and passing the ozone through the porous matrix to react the ozone with the chlorite.

In one aspect, this disclosure provides a method of producing gaseous chlorine dioxide that includes (i) passing an ozone-containing gas through a solid porous matrix that includes chlorite reactant distributed therein, and (ii) reacting the ozone in the ozone-containing gas with the chlorite reactant to produce the gaseous chlorine dioxide.

In another aspect, this disclosure provides a system for producing gaseous chlorine dioxide. The system can include an ozone generator that is configured to produce an ozone-enriched gas, and a reactor that includes a solid porous polymer matrix with chlorite reactant distributed therein. The reactor can be configured to (i) receive the ozone-enriched gas from the ozone generator and (ii) exhaust a gas product including gaseous chlorine dioxide that is produced from reacting the chlorite reactant with ozone in the ozone-enriched gas.

In another aspect, this disclosure provides a substrate that includes a porous polymer matrix and a chlorite salt that is distributed in the porous polymeric matrix.

DETAILED DESCRIPTION OF EMBODIMENTS

Figure 1:
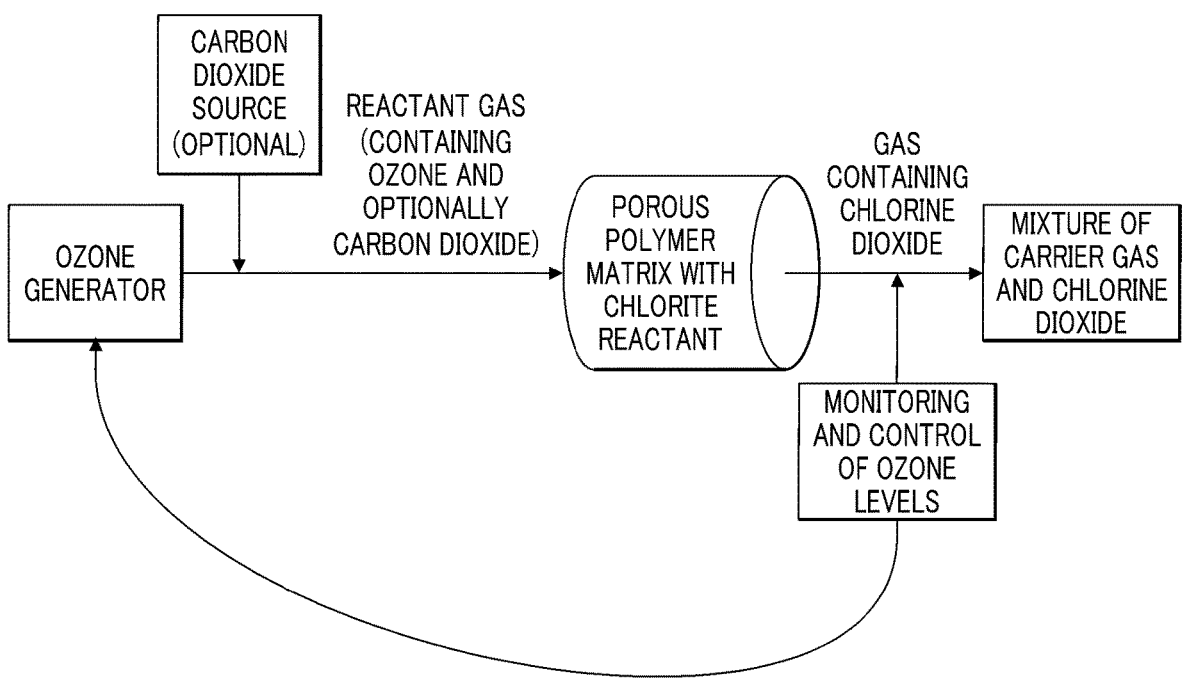
FIG. 1 is a schematic diagram showing a system for producing chlorine dioxide according to embodiments of the disclosure.

This disclosure relates to producing chlorine dioxide gas by reacting ozone gas with chlorite. This reaction is described in detail in U.S. Pat. No. 10,005,665, the entirety of which is incorporated by reference herein. U.S. Pat. No. 10,005,665 describes using the chlorite reactant in a solid form, such as granules, pellets, or powder, for example, where the ozone gas reacts with the chlorite at the surface of the solid media. It has been discovered by the inventors that using this type of reactant product does not efficiently use the chlorite reactant and can be unpredictable. Specifically, it was discovered that the ozone-containing gas will "channel" through the reaction chamber, where the gas stream follows the path of least resistance and creates a channel with preferential gas flow. This limits the amount of the solid chlorite media that comes into contact with and reacts with the ozone, and creates incomplete reactions where the effluent stream includes unreacted ozone gas and/or a low concentrations of chlorine dioxide gas. Additionally, when chlorite-containing granules or pellets are used in the reaction chamber, the ozone will first react with the exterior of each particle of solid media as it is exposed to the ozone, which creates an unreactive passive outer later on the solid media that no longer reacts with the ozone. This passivated or unreactive outer layer can prevent the ozone from penetrating within the solid particle and thereby slows or stops the reaction. These effects result in an inefficient use of the solid reactant media, and cause significant unpredictability as to when the reaction will cease or when the solid chlorite media needs to be replaced.

In connection with this disclosure, the chlorite reactant is distributed in a porous matrix, and the ozone-containing gas flows through the porous matrix to react with the chlorite and generate chlorine dioxide gas. The porous matrix can be, for example, a polymeric substrate that is formed into a desired shape, expanded glass pellets, or other ceramic materials.

The polymer matrix can be any polymer or combination of polymers that can be made to be porous and are sufficiently compatible with the chlorite reactant so that the chlorite can be distributed in the polymer matrix and not be substantially reactive with the matrix. Suitable polymers may include polyolefins such as homopolymers and copolymers of polyethylene and polypropylene, and fluoropolymers such as polytetrafluoroethylene polymers. Polymers with relatively high molecular weights can be used, such as between 2 million and 9 million, or from 3 million to 6 million. An example of such a polymer is ultrahigh molecular weight (UHMW) polyethylene. In some embodiments, the polymer matrix can include more than 40 wt. % of the polymers described above, more than 70 wt. %, more than 80 wt. %, or more than 90 wt. %. Other components such as fillers, strengthening/toughening agents, plasticizers, and colorants can be included in the polymer matrix.

The chlorite that is combined with the polymer can be a chlorite salt that is substantially dry (e.g., less than 1 wt. % water) and in a solid form such as granules, powder, etc. The amount of chlorite distributed in the polymer matrix can be from 10 to 90 wt. %, (i.e., percentage weight of the chlorite salt to the total weight of the chlorite salt and the polymer matrix), from 20 to 85 wt. %, from 35 to 80 wt. %, or from 50 to 75 wt. %. As described in U.S. Pat. No. 10,005,665, the chlorite reactant that is used can include a combination or mixture of the chlorite and unreactive or inert components (e.g., sodium carbonate, sodium bicarbonate, sodium sulfate, sodium chloride) that act to stabilize the chlorite reactant. However, it is believed possible that the porous matrix that is used in connection with this disclosure may act to stabilize the chlorite without the need to add a substantial amount of inert components. Thus, in some embodiments the porous matrix includes less than 5 wt. % of the above referenced inert salts, or less than 1 wt. %, or less than 0.5 wt. %.

In one aspect, the chlorite reactant can be distributed with the polymeric media in a liquid matrix, e.g., by combining the polymer and chlorite with a lubricating liquid (e.g., water) or organic solvent such as mineral spirits. Any lubricating liquid/organic solvents can be removed prior to, during, or after formation of the porous polymer matrix, e.g., by drying with heat or by solvent extraction, e.g., by adding isopropanol or hexanes followed by further drying or vacuum evaporation to remove these solvents. The chlorite reactant can alternatively be combined with the polymeric media by adding it to a melt of the polymer. One technique for distributing sorbents in a polymer matrix is described in U.S. Pat. No. 5,538,545, which is incorporate by reference herein in its entirety, and it is believed that the same or similar process could be used to incorporate chlorite reactant into a polymer matrix. The liquid polymer matrix can be sufficiently combined and/or mixed so that the chlorite is substantially homogeneously distributed throughout the liquid matrix, and likewise is substantially homogeneously distributed throughout the solid porous matrix that is ultimately formed (e.g., so that at least 90% of random samples taken from the porous matrix have a chlorite content that is within +/−5% of the mean).

The porous matrix can be formed by extruding the polymer solids into a desired shape, such as sheet, film, membrane, corrugated sheet, tube, rod, disk, pellets, etc., and cutting the extruded shape to the desired size, or alternatively molding the polymer solids into a desired shape and size. One suitable process for forming porous polymer matrices is described in U.S. Pat. No. 3,953,566, the entirety of which is incorporated by reference herein. The polymer matrix can be substantially dry, such that it has less than 1 wt. % of water or organic solvent, and preferably less than 0.5 wt. %. The porous polymer substrates can exhibit air permeabilities corresponding to a Frazier number that is in the range of from 0.4 to 400, and can have a porosity in a range of from 10% to 95%, or from 30% to 90%, for example. The porosity can be controlled so that unreacted chlorite in the matrix can be reached by the reactive ozone gas, and so that sufficient gas flow through the matrix is achieved.

One or more of the porous polymer substrates can be placed into a reaction chamber, optionally with other fillers or spacer elements. For example, several sheets can be rolled or stacked together and placed in a reaction chamber, such as a cylindrical canister. The reaction chamber can be sized to be portable, e.g., having a volume of from 50 $cm^3$ to 5,000 $cm^3$, from 100 $cm^3$ to 2,500 $cm^3$, or from 500 $cm^3$ to 1,250 $cm^3$. The substrates can be packed into the reaction chamber and oriented to optimize contact of the ozone-containing gas with the polymer matrix. The ozone-containing gas can be passed through the reaction chamber so that it flows through the porous matrix, contacts the chlorite reactant, and reacts with the chlorite at the solid-gas interface to generate a chlorine dioxide gas.

Using a porous matrix with chlorite distributed therein should substantially reduce or eliminate problems with "channeling" of the ozone gas streams, as described above, and thus enables the ozone to completely react with the chlorite in the reaction chamber and to produce more pure reaction streams. Additionally, by using a porous matrix, the problems created by "passivating" an exterior of a solid chlorite particle are reduced because the chlorite particles are more separated and distributed throughout the matrix, which provides increased surface area and reaction sites for the ozone to react with the chlorite as the ozone-containing gas flows through the porous matrix. Thus, for example, if a section of the porous media is passivated, the ozone will continue to flow throughout the porous media as it exits and can react with active chlorite at downstream locations. For these reasons, the chlorite reactant is more efficiently used, which means that smaller quantities of chlorite can be used to generate a given quantity of chlorine dioxide. Additionally, by using a porous matrix, the chlorite reactant can be passivated at a more predictable rate so that the life span of the consumable reactant is more certain.

An embodiment of a system for producing chlorine dioxide with the above-described porous polymer matrix is illustrated in FIG. 1. The system includes an ozone generator, a reaction vessel, and a monitor and controller, each in operational communication. The system can optionally include a carbon dioxide gas source that is coupled to the ozone-containing gas stream. The ozone generator is configured to produce and deliver an ozone gas into a first end of the reaction vessel. The carbon dioxide gas can be combined or mixed with the ozone gas stream (as shown in FIG. 1), or can be separately provided to the reaction vessel. The reaction vessel includes a substrate that is a porous polymer matrix, and the chlorite reactant is distributed in the porous polymer matrix. As ozone (and optionally carbon dioxide) flow through and contact the chlorite in the porous matrix, a chlorine dioxide gas is produced. The chlorine dioxide gas is evacuated out of the reaction vessel at a second end of the reaction vessel into either a liquid storage media or a receiving stream.

Figure 2:
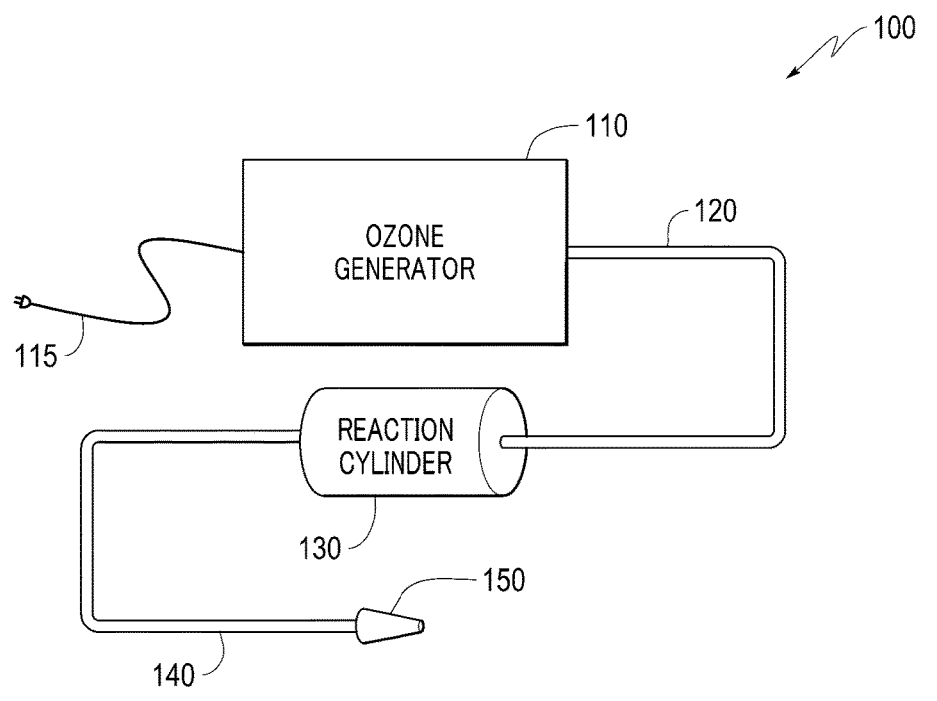
FIG. 2 is a schematic diagram showing a portable device that can be used for producing and applying chlorine dioxide.

FIG. 2 is schematic diagram of a portable device 100 that can be used to be produce chlorine dioxide according to one embodiment. The device 100 includes ozone generator 110, which has a power chord 115 that connects it to an A/C power source. The ozone generator 110 generates ozone, and an ozone-containing gas flows through hose 120 to a reaction cylinder 130. The reaction cylinder 130 includes one or more sheets of porous polymer matrix with chlorite reactant. The ozone in the ozone-containing gas reacts with the chlorite in the solid polymer matrix to produce chlorine dioxide. The effluent gas from the reaction cylinder 130, which includes chlorine dioxide, flows through hose 140 to a nozzle or outlet 150. The device is portable and allows chlorine dioxide to be generated and applied on-demand, e.g., to disinfect water, equipment, or surfaces.

Example

A laboratory experiment was conducted to determine whether chlorite is compatible with polyethylene in a polymer matrix to generate chlorine dioxide by the above-described techniques. A 40% aqueous solution of sodium chlorite solids (80 wt. % sodium chlorite) was added in an amount of 100 g equivalent of sodium chlorite to 300 mL mineral oil, and was combined with 100 g UHMW granular polyethylene. The solids were extracted with hexanes and then dried at 40° C. The solids were exposed to ozone and observed to generated chlorine dioxide.

This experiment demonstrated that chlorite could be successfully incorporated into a polymer matrix and used to produce chlorine gas by contacting the matrix with ozone. It is believed that more porous substrates would enable a higher loading of chlorite reactant.

Although only a few embodiments have been described in detail above, those skilled in the art will readily appreciate that many modifications are possible in the example embodiments without materially departing from the disclosed embodiments. Accordingly, all such modifications are intended to be included within the scope of this disclosure as defined in the following claims.

What is claimed is:

1. A method of producing gaseous chlorine dioxide, the method comprising:

passing an ozone-containing gas through a solid porous matrix that includes chlorite reactant distributed therein, and reacting the ozone in the ozone-containing gas with the chlorite reactant to produce the gaseous chlorine dioxide.

2. The method of claim 1, wherein the solid porous matrix is a porous polymer matrix.

3. The method of claim 2, wherein the porous polymer matrix includes polyethylene.

4. The method of claim 2, wherein the porous polymer matrix includes a fluoropolymer.

5. The method of claim 1, wherein the chlorite reactant comprises solid chlorite particles that are distributed in the solid porous matrix.

6. The method of claim 5, wherein the ozone-containing gas is contacted with the solid chlorite particles to react the ozone in the ozone-containing gas with the chlorite reactant.

7. The method of claim 1, wherein the solid porous matrix includes from 10 to 90% by weight of the chlorite reactant.

8. The method of claim 1, wherein the solid porous matrix has a porosity in a range of from 10% to 95%.

9. A system for producing gaseous chlorine dioxide, the system comprising:

an ozone generator that is configured to produce an ozone-enriched gas; and a reactor that includes a solid porous polymer matrix with chlorite reactant distributed therein, the reactor being configured to (i) receive the ozone-enriched gas from the ozone generator and (ii) exhaust a gas product including gaseous chlorine dioxide that is produced from reacting the chlorite reactant with ozone in the ozone-enriched gas.

10. The system of claim 9, wherein the chlorite reactant comprises solid chlorite particles that are distributed in the solid porous polymer matrix.

11. The system of claim 10, wherein the ozone-enriched gas is contacted with the solid chlorite particles to react the ozone in the ozone-containing gas with the chlorite reactant.

12. The system of claim 9, wherein the solid porous polymer matrix has a porosity in a range of from 10% to 95%.

* * * * *